United States Patent
Bach

(10) Patent No.: US 10,949,644 B2
(45) Date of Patent: Mar. 16, 2021

(54) FINGERPRINT SENSING METHOD BASED ON TOUCH PRESSURE IN BLACK SCREEN MODE OF TOUCH INPUT DEVICE AND TOUCH INPUT DEVICE FOR THE SAME

(71) Applicant: HiDeep Inc., Seongnam-si (KR)

(72) Inventor: Woohyun Bach, Seongnam-si (KR)

(73) Assignee: HIDEEP INC.

( * ) Notice: Subject to any disclaimer, the term of this patent is extended or adjusted under 35 U.S.C. 154(b) by 0 days.

(21) Appl. No.: 16/266,044

(22) Filed: Feb. 2, 2019

(65) Prior Publication Data

US 2019/0244007 A1 Aug. 8, 2019

(30) Foreign Application Priority Data

Feb. 6, 2018 (KR) .......................... 1020180014767

(51) Int. Cl.
| | | |
|---|---|---|
| G06K 9/00 | (2006.01) | |
| G06F 3/041 | (2006.01) | |
| G06F 3/0488 | (2013.01) | |
| G06F 3/0481 | (2013.01) | |
| G06F 3/0484 | (2013.01) | |

(52) U.S. Cl.
CPC ......... *G06K 9/00087* (2013.01); *G06F 3/041* (2013.01); *G06F 3/0414* (2013.01); *G06K 9/00926* (2013.01); *G06K 9/00993* (2013.01); *G06F 3/0484* (2013.01); *G06F 3/0488* (2013.01); *G06F 3/04817* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2015/0074615 | A1* | 3/2015 | Han | .................... H04L 63/0861 715/863 |
| 2017/0316250 | A1* | 11/2017 | Roh | ........................ G06F 21/32 |
| 2018/0329560 | A1* | 11/2018 | Kim | ................... G06K 9/00006 |

FOREIGN PATENT DOCUMENTS

| | | |
|---|---|---|
| KR | 10-2017-0022192 | 2/2017 |
| KR | 10-2017-0122386 | 6/2017 |

OTHER PUBLICATIONS

Office Action issued in the corresponding Korean Application No. 10-2019-0045695 dated May 12, 2020.

\* cited by examiner

*Primary Examiner* — Duane N Taylor, Jr.
(74) *Attorney, Agent, or Firm* — The Belles Group, P.C.

(57) ABSTRACT

A fingerprint sensing method based on touch pressure in a black screen mode of a touch input device according to the embodiment of the present invention includes: sensing first pressure which has a value equal to or greater than a first predetermined threshold value and is applied by an object in the black screen mode; determining continuously after sensing the first pressure whether second pressure which has a value equal to or greater than a second predetermined threshold value and is different from the first pressure is sensed or not; recognizing a fingerprint of the object when the second pressure is sensed; determining whether or not the recognized fingerprint is identical to a fingerprint previously registered in the touch input device; and performing a predetermined operation when the recognized fingerprint is identical to the previously registered fingerprint.

12 Claims, 8 Drawing Sheets

FINGERPRINT SENSING METHOD BASED ON TOUCH PRESSURE IN BLACK SCREEN MODE OF TOUCH INPUT DEVICE AND TOUCH INPUT DEVICE FOR THE SAME

CROSS-REFERENCE TO RELATED PATENT APPLICATIONS

The present application claims priority to Korean Patent Application No. 10-2018-0014767, filed Feb. 6, 2018. The disclosure of the aforementioned priority application is incorporated herein by reference in its entirety.

BACKGROUND

Field

The present disclosure relates to a fingerprint sensing method based on touch pressure in a black screen mode of a touch input device and the touch input device of the same, and more particularly to a fingerprint sensing method based on touch pressure in a black screen mode of a touch input device, which enables easily fingerprint authentication only by sensing touch pressure in the black screen mode and the touch input device for the same.

Description of the Related Art

Various types of input devices are being used to operate a computing system such as smartphones, tablet PCs, laptop computers, navigation devices, KIOSKs, etc. A touch screen (a touch-sensitive display) among various types of input devices is being used increasingly in the computing system due to its easy and simple operability. Further, the laptop computer uses a touch panel, and thus, controls the screen displayed on the monitor or program execution. The use of this touch sensing means makes a user interface simple.

With the development of the technology, the security of personal information stored in electronic devices becomes more necessary. For this purpose, a method has been mainly used, which blocks third party access to the electronic devices through security settings such as a pattern lock or password, etc.

Recently, a security method is being used, in which user's fingerprint is authenticated by using a home key button mounted on the front side of the electronic device and if the fingerprint authentication is successful, the access to the electronic device is granted.

In general, the electronic device must be activated in advance for the purpose of performing the fingerprint authentication. Therefore, when the electronic device is in a black screen mode (an idle mode or in a sleep mode), the fingerprint was possible only when the user had to switch the mode of the electronic mode into an active mode or wake-up mode by pressing the home button or power button. Since such a fingerprint authentication method has an inconvenience caused by an additional procedure of pressing the separate home button or power button, it is necessary to enable the fingerprint authentication even in the black screen mode.

SUMMARY

One embodiment is a fingerprint sensing method based on touch pressure in a black screen mode of a touch input device. The fingerprint sensing method includes: sensing first pressure which has a value equal to or greater than a first predetermined threshold value and is applied by an object in the black screen mode; determining continuously after sensing the first pressure whether second pressure which has a value equal to or greater than a second predetermined threshold value and is different from the first pressure is sensed or not; recognizing a fingerprint of the object when the second pressure is sensed; determining whether or not the recognized fingerprint is identical to a fingerprint previously registered in the touch input device; and performing a predetermined operation when the recognized fingerprint is identical to the previously registered fingerprint.

Another embodiment is a touch input device that includes: a pressure sensor which senses first pressure which has a value equal to or greater than a first predetermined threshold value and is applied by an object in a black screen mode; a fingerprint sensor which recognizes a fingerprint of the object; and a control unit which determines continuously after sensing the first pressure whether second pressure which has a value equal to or greater than a second predetermined threshold value and is different from the first pressure is sensed or not, determines, when the second pressure is sensed, whether or not the fingerprint recognized by the second pressure is identical to a fingerprint previously registered in the touch input device, and performs a predetermined operation when the recognized fingerprint is identical to the previously registered fingerprint.

DETAILED DESCRIPTION

Figure 1:
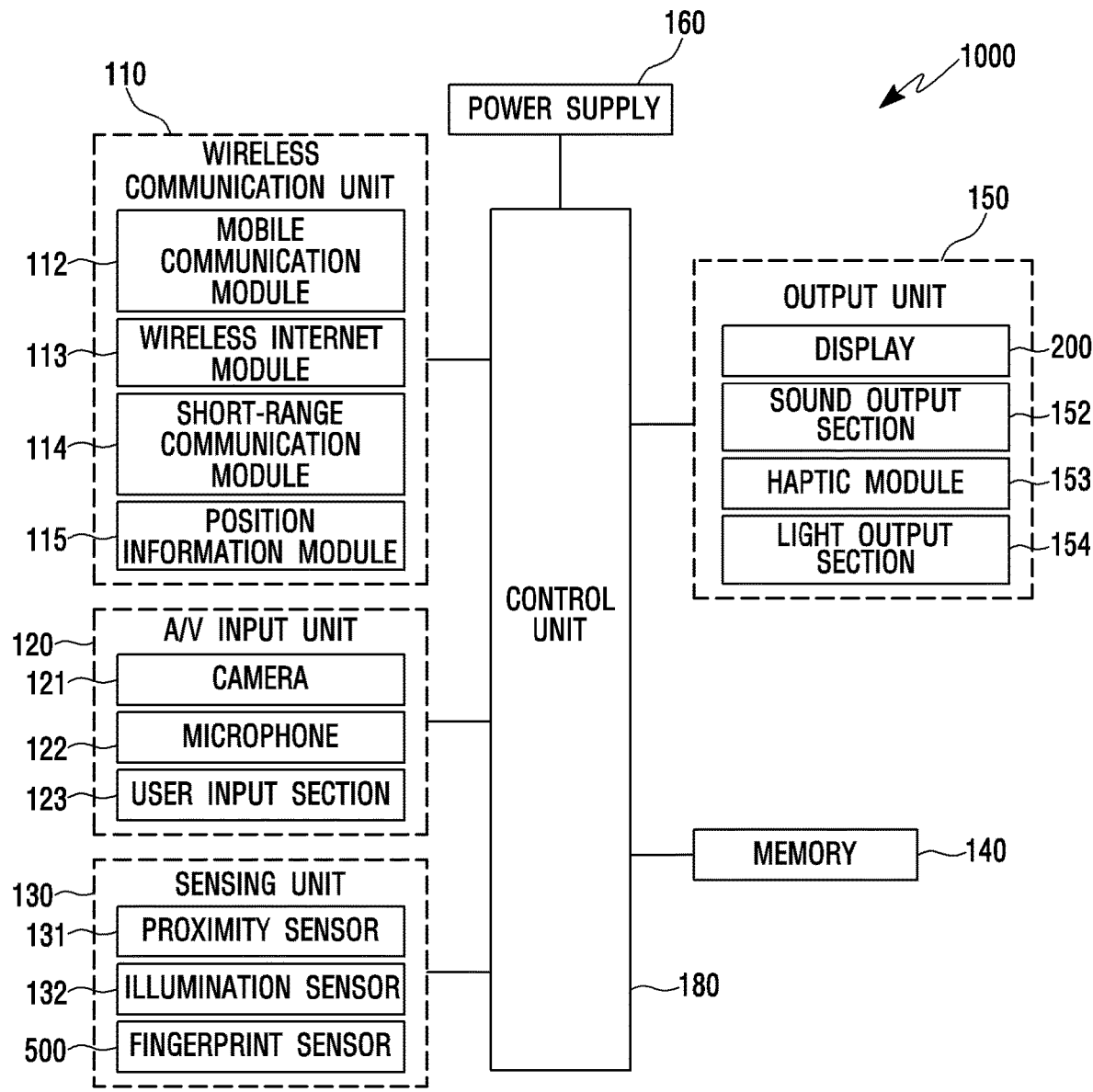
FIG. 1 is a block diagram of a touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a touch input device according to an embodiment of the present invention will be described with reference to the accompanying drawings.

A touch input device 1000 which is described in the present specification may include a cellular phone equipped with a touch screen, a smartphone, a laptop computer, a digital broadcast terminal device, a personal digital assistant, a navigation system, a slate PC, a tablet PC, an Ultrabook, a wearable device, KIOSK, etc.

FIG. 1 is a block diagram of an embodiment of the touch input device 1000, to which the present invention can be applied. FIG. 1 shows an example in which the present invention has been applied to a smartphone.

The touch input device 1000 may include a wireless communication unit 110, an input unit 120, a sensing unit 130, an output unit 150, a memory 140, a control unit 180, and a power supply 160. The components shown in FIG. 1 are not indispensable in the implementation of the device. The device described in the present specification may have a larger or smaller number of the components than that of the components described above.

The wireless communication unit 110 may include at least one module enabling wireless communication between the touch input device 1000 and a wireless communication system, between the touch input device 1000 and another touch input device 1000, or between the touch input device 1000 and an external server. The wireless communication unit 110 may include at least one module which connects the touch input device 1000 to at least one network. The wireless communication unit 110 may include at least one of a mobile communication module 112, a wireless internet module 113, a short-range communication module 114, and a position information module 115.

The mobile communication module 112 transmits/receives a radio signal to and from at least one of a base station, an external terminal, and a server in a mobile communication network constructed in accordance with communication methods or technical standards for mobile communication. The wireless internet module 113 refers to a module for wireless internet access and may be built in or externally attached to the touch input device 1000.

The wireless internet module 113 transmits/receives a radio signal in a communication network based on wireless internet technologies such as Wireless LAN (WLAN), Wireless-Fidelity (Wi-Fi), etc.

The short-range communication module 114 supports short range communication by using Bluetooth™, Radio Frequency Identification (RFID), Infrared Data Association (IrDA), ZigBee, Near Field Communication (NFC), etc.

The position information module 115 obtains the position (or current position) of the device. A global positioning system (GPS) module or a wireless fidelity (Wi-Fi) module can be taken as a representative example of the position information module 115. However, the position information module 115 is not limited to a module for directly calculating or obtaining the position of the device.

The input unit 120 may include a video input section or a camera 121 for inputting a video signal, an audio input section or a microphone 122 for inputting an audio signal, and a user input section 123 (e.g., a touch key, a mechanical key, etc.) for receiving information of a user. The voice data or image data collected by the input unit 120 may be analyzed and processed as a control instruction of the user.

The camera 121 processes image frames of still images or videos, etc., obtained in a video call mode or in a photographing mode by an image sensor. The processed image frames may be displayed on a display 200 or may be stored in the memory 140.

The microphone 122 processes an external sound signal into an electrical voice data. The processed voice data can be variously used according to the function (or application program being executed) by the touch input device 1000.

The user input section 123 receives information from the user. When information is received through the user input section 123, the control unit 180 can control the operation of the touch input device 1000 in correspondence to the received information. The user input section 123 may include a mechanical input means (or a mechanical key, for example, a button disposed on the front, rear or side surface of the touch input device 1000, a dome switch, a jog wheel, a jog switch, etc.) and a touch-type input means. For example, the touch-type input means may include a virtual key, a soft key, or a visual key displayed on the touch screen through software processing, or may include a touch key disposed on a portion other than the touch screen. Meanwhile, the virtual key or the visual key can be displayed on the touch screen in various forms. For example, the virtual key or the visual key may consist of a graphic, a text, an icon, a video, or a combination thereof.

The sensing unit 130 may include at least one sensor for sensing at least one of information on the inside of the device, information on ambient environment surrounding the device, and user information. For example, the sensing unit 130 may include a proximity sensor 131, an illumination sensor 132, a touch sensor, an acceleration sensor, a magnetic sensor, a G-sensor, a gyroscope sensor, a motion sensor, etc. Further, a fingerprint sensor 500 to be described in FIG. 2 may be included.

The output unit 150 generates an output related to a visual sense, an auditory sense, or a tactile sense, etc. The output unit 150 may include at least one of the display 200, a sound output section 152, a haptic module 153, and a light output section 154.

The display 200 may include, for example, a liquid crystal display (LCD), a thin film transistor-liquid crystal display (TFT LCD), an organic light-emitting diode (OLED), a flexible display, a 3D display, an e-ink display, etc. The display 200 can implement the touch screen by forming a mutual layer structure with the touch sensor or by being integrally formed with the touch sensor. The touch screen can function as the user input section 123 providing an input interface between the touch input device 1000 and the user and can provide an output interface between the touch input device 1000 and the user as well.

In order that the display 200 can receive a control command in a touch manner, the display 200 may include the touch sensor which senses a touch on the display 200. Through this, when a touch occurs on the display 200, the touch sensor senses the touch and the control unit 180 may generate a control command corresponding to the touch on the basis of the touch. The content input in a touch manner may be characters or numbers, instructions in various modes, or a menu item that can be designated. Meanwhile, the touch sensor may be formed in the form of a film having a touch pattern and may be disposed between a window and a display on the back side of the window, or may be composed of a metal wire directly patterned on the back side of the window. According to the embodiment of the present invention, a controller which senses whether the touch occurs or not and a touch position on the basis of a signal sensed by the touch sensor may be provided on the display 200. In this case, the controller transmits the sensed touch position to the control unit 180. Also, the display 200 may transmit the signal sensed by the touch sensor or data obtained by converting digitally the signal to the control unit 180, and the control unit 180 may determine whether the touch occurs or not and the touch position.

The sound output section 152 outputs audio signals such as music, voice, etc., and may include a receiver, a speaker, a buzzer, and the like. The haptic module 153 generates various tactile effects that the user can feel. A typical example of the tactile effect generated by the haptic module 153 may be vibration. The light output section 154 outputs a signal notifying the occurrence of an event by using the light of the light source of the touch input device 1000. An example of the event that occurs in the touch input device 1000 may include message reception, call signal reception, missed call, alarm, schedule notification, email reception, information reception through an application, etc.

The memory 140 stores data supporting various functions of the touch input device 1000. The memory 140 may store a plurality of application programs (or applications) executed by the touch input device 1000, data for operation of the touch input device 1000, and commands. At least some of these application programs may be downloaded from an external server via wireless communication. At least some of these application programs may exist in the touch input device 1000 from the time of release of the touch input device 1000 for the purpose of basic functions (e.g., call incoming and outgoing, message reception and transmission) of the touch input device 1000. Meanwhile, the application program is stored in the memory 140, installed in the touch input device 1000, and can be operated by the control unit 180 to perform the operation (or function) of the device.

The control unit 180 typically controls not only the operations related to the application programs, but also the overall operations of the touch input device 1000. The control unit 180 processes signals, data, information, etc., input or output through the above-described components, or executes the application programs stored in the memory 140, thereby providing or processing appropriate information or functions to the user. In addition, the control unit 180 can control at least some of the components in order to execute the application programs stored in the memory 140. Further, the control unit 180 can operate the at least two components included in the touch input device 1000 in a combination thereof in order to execute the application programs.

The power supply 160 receives an electric power from external and internal power supplies under the control of the control unit 180, and supplies the electric power to each of the components included in the touch input device 100. The power supply 160 may include a battery. The battery may be an embedded battery or a replaceable battery.

At least some of the respective components can operate in cooperation with each other in order to implement the operation, control or control method of the device according to various embodiments to be described below. Also, the operation, control or control method of the device can be implemented in the device by executing at least one application program stored in the memory 140.

Figure 2:
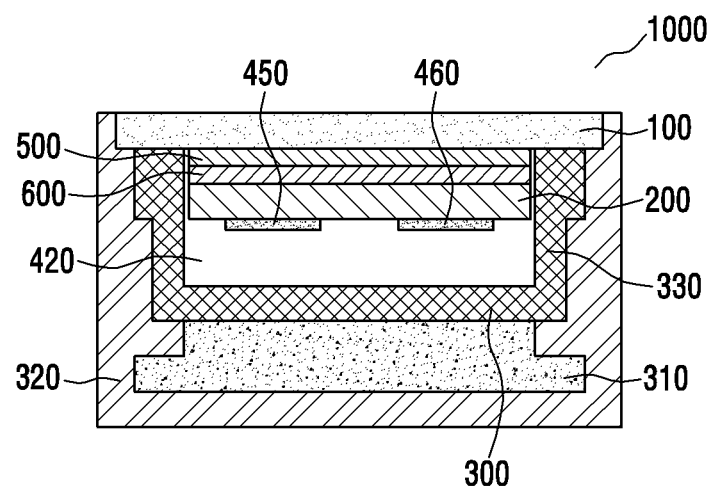
FIG. 2 is a view referred to for describing the touch input device including a fingerprint sensor and a pressure sensor in accordance with the embodiment of the present invention.

FIG. 2 is a view referred to for describing the touch input device including a fingerprint sensor 500 and pressure sensors 450 and 460 in accordance with the embodiment of the present invention.

As shown in FIG. 2, the touch input device 1000 according to the embodiment of the present invention may include a cover layer 100, the fingerprint sensor 500 disposed under the cover layer 100, a touch sensor 600 disposed under the fingerprint sensor 500, and the display 200 disposed under the touch sensor 600. According to the embodiment, the pressure sensors 450 and 460 may be disposed under the display 200.

The fingerprint sensor 500 according to the embodiment of the present invention may be disposed between the cover layer 100 and the touch sensor 600. Alternatively, according to another embodiment, the fingerprint sensor 500 may be also disposed not only on the display 200 but also under the display 200, or may be disposed within the display 200.

The fingerprint sensor 500 may include, for example, a cap composed of an array of a plurality of capacitances and sense the fingerprint of a finger in the manner of a cap. For another example, the fingerprint sensor 500 may include light receiving sensors which receive light reflected from the display 200 and sense the fingerprint of a finger in an optical manner. In this case, an image of the fingerprint which is input to the fingerprint sensor 500 may be distorted due to the diffraction of the light by irregular holes of the display 200. Therefore, a pin hole layer (not shown) may be further provided between the display 200 and the fingerprint sensor 500. The pin hole layer reduces the diffraction of the light reflected from the display 200, thereby allowing the fingerprint sensor 500 to obtain the fingerprint image having the minimized distortion. For another example, the fingerprint sensor 500 may include a piezo film, and thus, can sense the fingerprint of a finger in an ultrasonic manner.

In the touch input device 1000 according to the embodiment of the present invention, a mid-frame 300 can, for example, perform a function of surrounding a mounting space 310, etc., in which a circuit board and/or a battery for the operation of the touch input device 1000, together with a housing 320 that is an outermost member of the touch input device 1000, can be positioned. Here, a central processing unit (CPU), an application processor (AP), or the like may be mounted on the circuit board, as a mainboard, for the operation of the touch input device 1000. The display 200 may be separated from the circuit board and/or battery for the operation of the touch input device 1000 by the mid-frame 300. Electrical noise which occurs in the display 200 and noise which occurs in the circuit board can be blocked.

In the touch input device 1000, the touch sensor 600 or the cover layer 100 may be formed wider than the display 200, the mid-frame 300, and the mounting space 310. Accordingly, the housing 320, together with the touch sensor 600, may be formed to surround the display 200, the mid-frame 300, and the circuit board.

The touch input device 1000 according to the embodiment of the present invention may detect the touch position through the touch sensor 600 and may detect the touch pressure by disposing a separate electrode, which is different from the electrode used to detect the touch position and is different from the electrode used to drive the display, and by using the separate electrode as a pressure sensing unit. Here, the touch sensor 600 may be positioned inside or outside the display 200.

Hereinafter, the components for pressure detection are collectively referred to as the pressure sensing unit. For example, in the embodiment, the pressure sensing unit may include the pressure sensors 450 and 460.

Also, the pressure sensing unit may further include, for example, a spacer layer 420 composed of an air gap.

According to the embodiment, the spacer layer 420 may be implemented by the air gap. According to the embodiment, the spacer layer may be made of an impact absorbing material. According to the embodiment, the spacer layer 420 may be filled with a dielectric material. According to the embodiment, the spacer layer 420 may be made of a material having a restoring force by which the material contracts by applying the pressure and returns to its original shape by releasing the pressure. According to the embodiment, the spacer layer 420 may be made of an elastic foam. Also, since the spacer layer is disposed under the display 200, the spacer layer may be made of a transparent material or an opaque material.

In addition, a reference potential layer may be disposed under the display 200. Specifically, the reference potential layer may be formed on the mid-frame 300 disposed under the display 200, or the mid-frame 300 itself may serve as the reference potential layer. Also, the reference potential layer may be disposed on the mid-frame 300 and under the display 200. The reference potential layer may be disposed on a cover (not shown) which performs a function of protecting the display 200, or the cover itself may serve as the reference potential layer. The display 200 is bent by applying pressure to the touch input device 1000. A distance between the reference potential layer and the pressure sensors 450 and 460 may be changed by the bending of the display 200. Also, the spacer layer may be disposed between the reference potential layer and the pressure sensors 450 and 460. Specifically, the spacer layer may be disposed between the display 200 and the mid-frame 300 on which the reference potential layer has been disposed or between the display 200 and the cover on which the reference potential layer has been disposed.

For the purpose of clearly distinguishing between the sensors 450 and 460 for detecting the pressure and the electrode included in the touch sensor 600, the sensors 450 and 460 are referred to as pressure sensors 450 and 460. Here, the pressure sensors 450 and 460 can be composed of an opaque material as well as a transparent material because the pressure sensors 450 and 460 are disposed in the rear side of the display 200 instead of the front side. When the display 200 is an LCD panel, the pressure sensors 450 and 460 can be composed of a transparent material such as ITO.

Hereinafter, a fingerprint sensing method based on touch pressure in a black screen mode of the touch input device according to the embodiment of the present invention will be described with reference to FIGS. 3 and 4.

Figure 4A:
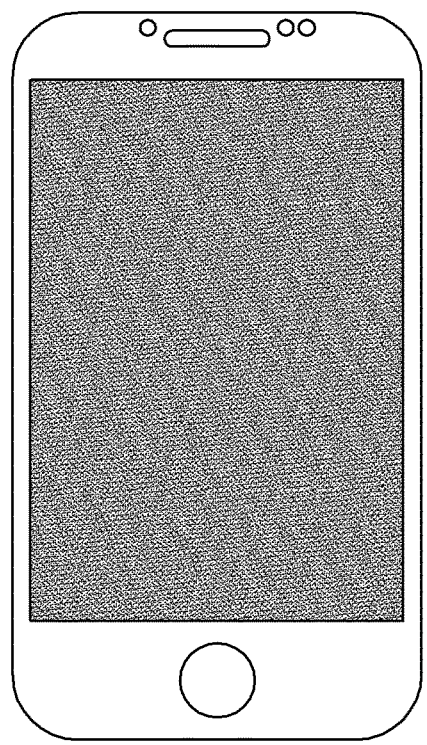
FIG. 4a to FIG. 4i are view referred to for describing the fingerprint sensing method according to FIG. 3.
Figure 4B:
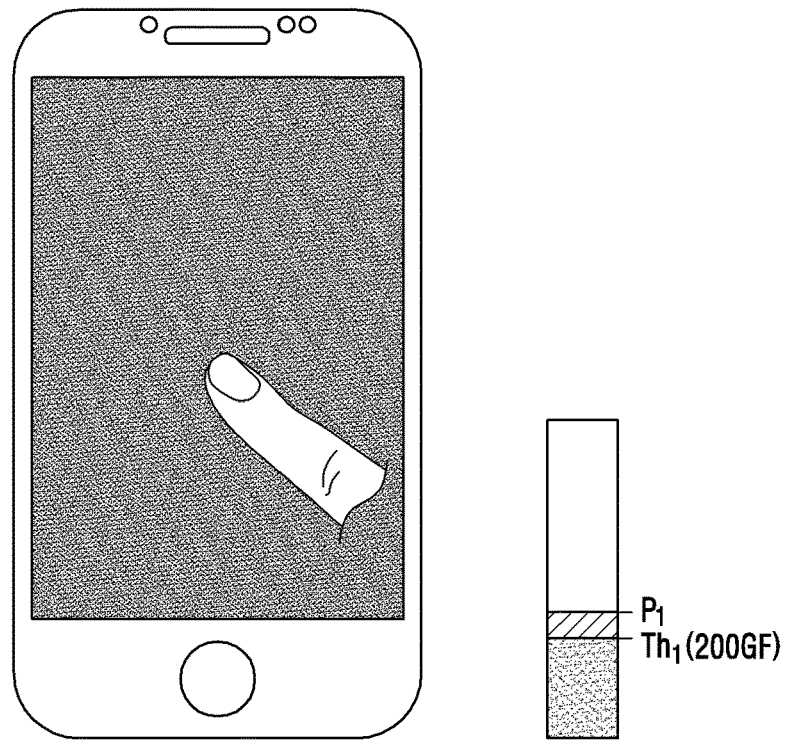

As shown in FIGS. 4a and 4b, the pressure sensors 450 and 460 can sense a first pressure P1 which is applied by an object in the black screen mode (S100). The black screen mode of FIG. 4a refers to a standby mode in a low power state of the touch input device. According to the embodiment, the object may include a finger, a pen, and the like. According to the embodiment, the first pressure P1 may include pressure with a value greater than a first predetermined threshold value Th1. Information on the first threshold value may be stored in advance in the memory 140.

Figure 4C:

When the first pressure is sensed, the control unit 180 may display, as shown in FIG. 4c, at least one icon on the display 200 on the basis of the sensed first pressure (S200). According to the embodiment, the kind, the number and/or disposition location, size, etc., of the icons which are displayed may be previously set and be stored in advance in the memory 140. FIG. 4c shows that a clock icon is located in the upper part of the screen and a camera icon and a video icon are displayed on both sides of a portion where the touch occurs. However, the embodiment of the present invention is not limited to this.

Figure 3:
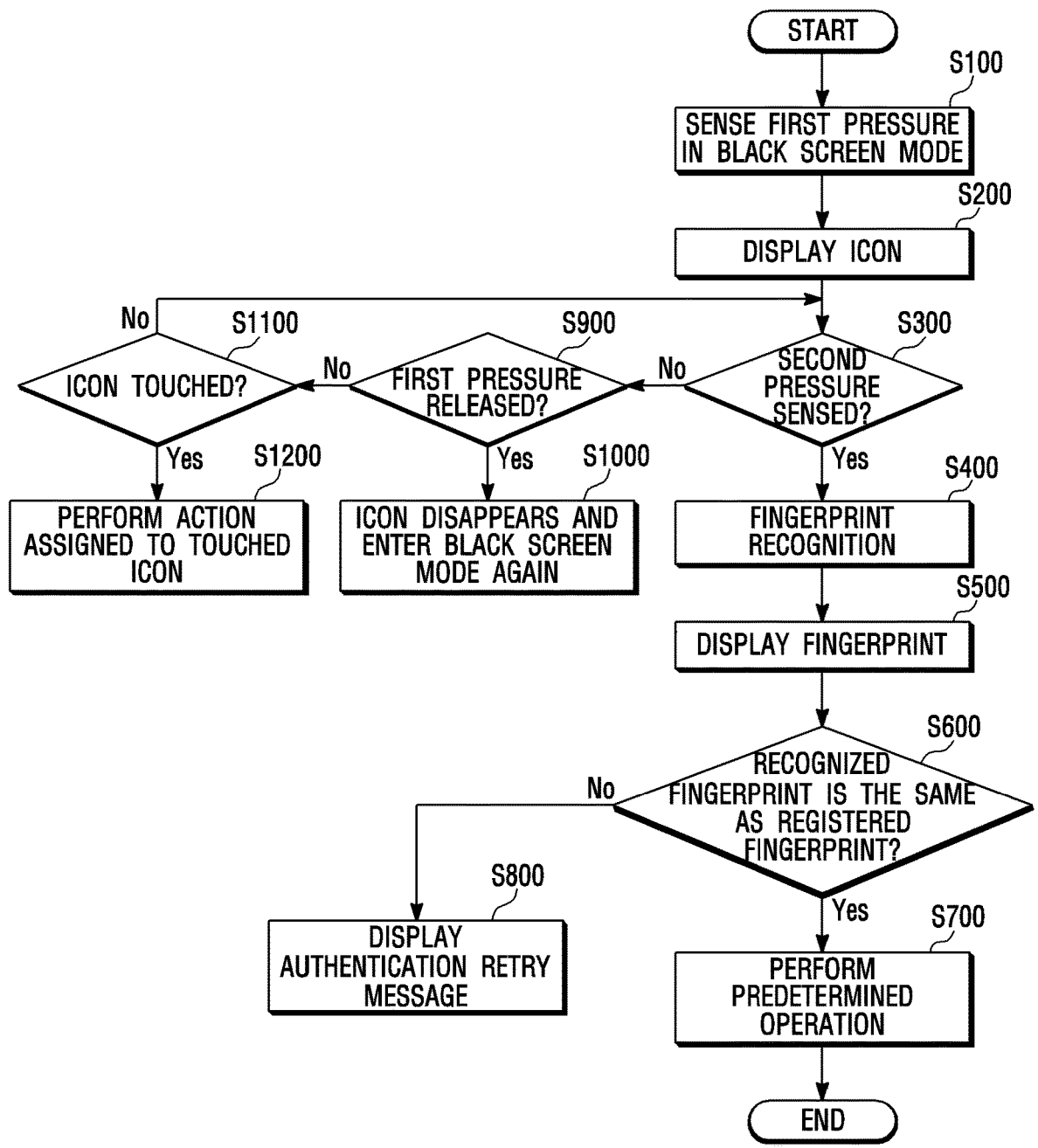
FIG. 3 is a flowchart of a fingerprint sensing method based on touch pressure in a black screen mode of the touch input device according to the embodiment of the present invention.

Though not shown in FIG. 3, the control unit 180 may prepare for fingerprint recognition by activating the fingerprint sensor 500 when the first pressure is sensed. This is a preparation step of sensing a second pressure. For example, the resolution of the touch region on the display 200 where the first pressure has been sensed can be set high.

Figure 4D:
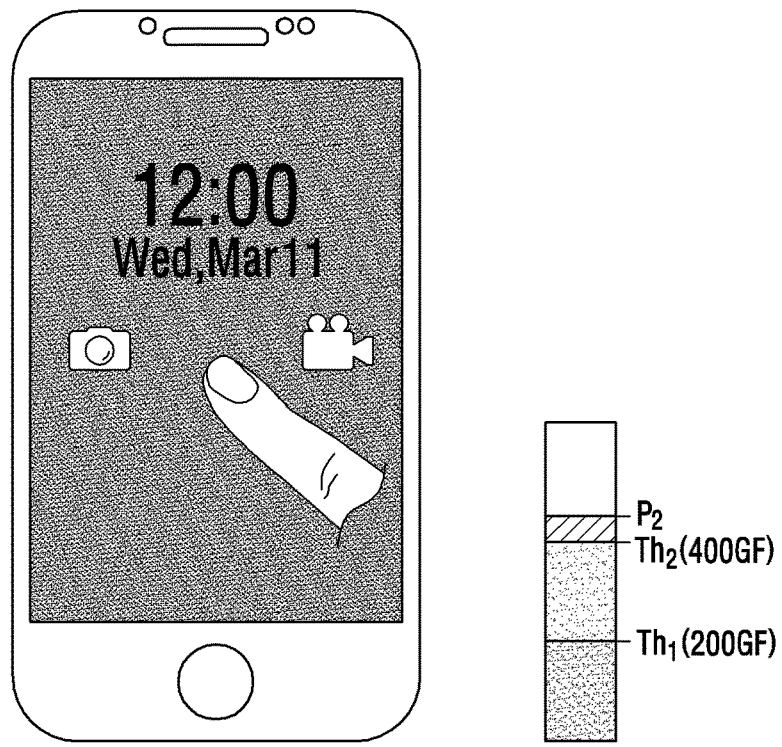

As shown in FIG. 4d, the control unit 180 may determine continuously whether a second predetermined pressure P2 different from the first pressure is sensed or not (S300). The second pressure P2 according to the embodiment may include pressure with a value greater than a second predetermined threshold value Th2. Information on the second threshold value may be stored in advance in the memory 140. According to the embodiment, the second threshold value may be greater than the first threshold value. For example, when the first threshold value is set to 200 GF (gram force) and the second threshold value is set to 400 GF, the control unit 180 may determine whether or not the second pressure greater than 400 GF is continuously applied after the first pressure greater than 200 GF is applied for the first time.

Figure 4E:

If the control unit 180 determines that the second pressure is sensed, the fingerprint of the object can be recognized (S400). Also, an image of the recognized fingerprint (dotted area) of the object may be, as shown in FIG. 4e, displayed on the display 200 (S500). As shown in FIG. 4e, the fingerprint image can be displayed on the position where the second pressure has been applied or can be displayed on a position spaced apart by a predetermined distance from the position where the second pressure has been applied. The position of the displayed fingerprint image, the size of the displayed fingerprint image, and/or the predetermined spaced distance may be set in advance and be stored in the memory 140.

Figure 4F:

The control unit 180 may determine whether or not the fingerprint recognized by the second pressure is identical to a fingerprint which has been registered for the first time in advance (S600). Though not shown in FIG. 3, the control unit 180 may perform a fingerprint registration step of scanning the fingerprint and registering in advance when the second pressure is sensed for the first time. That is, even when a fingerprint is registered for the first time in order to recognize the fingerprint by the second pressure, the fingerprint is scanned in the state where the second pressure is applied. Such a process can be repeated. When the control unit 180 determines that the fingerprint which has been registered for the first time is identical to the fingerprint recognized by the second pressure, the control unit 180 may perform a predetermined operation based on the second pressure (S700). For example, as shown in FIG. 4f, the touch input device may enter an unlock mode. Alternatively, a predetermined application can be set to be executed immediately.

Figure 4G:

Besides, additional authentication processes can be further performed according to another embodiment. For example, even when the second pressure with a magnitude greater than the second threshold value is applied, additional authentication processes are performed in additional consideration of time for which the second pressure is applied and/or an area where the second pressure is applied. Therefore, not only the touch input device enters the unlock mode, but also different applications can be set to be executed immediately. Specifically, when the second pressure is applied for a first time and/or to a first area, a first application may be executed immediately. When the second pressure is applied for a second time and/or to a second area, a second application may be executed immediately. If the control unit 180 determines that the fingerprint recognized by the second pressure is not identical to the already registered fingerprint, an authentication retry message may be, as shown in FIG. 4g, displayed (S800).

Figure 4H:
Figure 4I:
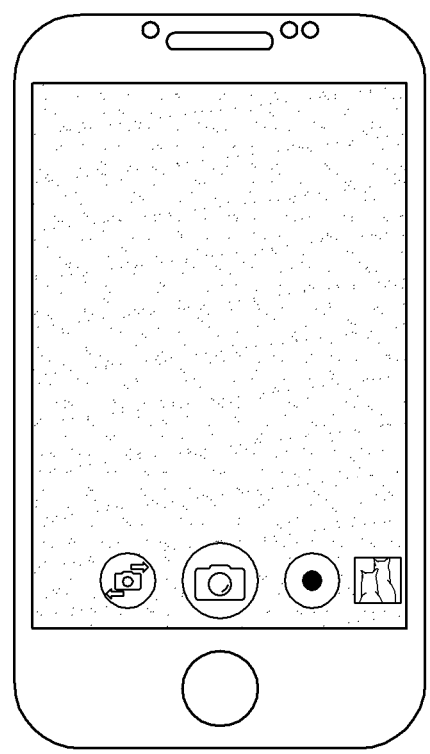

In step S300, if the control unit 180 determines that the second pressure is not sensed, the control unit 180 may determine whether the first pressure on the display 200 is released or not (S900). In the embodiment, the release of the first pressure may include a state where even a general touch (2D) is released or a state where only the first pressure is release and the general touch (2D) is maintained. If the control unit 180 determines that the first pressure is released, at least one displayed icon disappears and the touch input device can be controlled to enter the initial black screen mode again (S1000) as shown in FIG. 4a. On the other hand, any one of one or more icons is touched in the state where the first pressure is not released, an action assigned to the touched icon can be performed (S1100 and S1200). For example, in the state where the camera icon and the video icon are, as shown in FIG. 4c, displayed, when the camera icon is touched as shown in FIG. 4h, the camera icon is, as shown in FIG. 4i, performed.

The second threshold value greater than the first threshold value has been taken as an example in the embodiment of the present invention. Furthermore, contrary to this, the above-described embodiment can be applied in the same/similar manner even when the second threshold value is less than the first threshold value. That is to say, when the magnitude of the second applied pressure is less than the magnitude of the first applied pressure, it is also possible to set that the fingerprint is recognized.

Also, the embodiment of the present invention has described that the fingerprint is recognized by applying the pressure twice. However, the right scope of the present invention is not limited to this. That is, it is set that the fingerprint is recognized by applying the pressure three or more times, and the above-described embodiment can be applied in the same/similar manner.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A fingerprint sensing method based on touch pressure in a black screen mode of a touch input device comprising a display, the fingerprint sensing method comprising:
   sensing a first pressure which has a value equal to or greater than a first predetermined threshold value and is applied by an object on a black screen of the display in the black screen mode;
   displaying at least one icon on the black screen of the display when the first pressure is sensed;
   determining continuously after sensing the first pressure whether a second pressure which has a value equal to or greater than a second predetermined threshold value and is different from the first pressure, is sensed or not;
   displaying a fingerprint image for recognizing a fingerprint of the object on the black screen of the display when the second pressure is sensed;
   determining whether or not the recognized fingerprint is identical to a fingerprint previously registered in the touch input device; and
   displaying a home screen on the display when the recognized fingerprint is identical to the previously registered fingerprint;
   wherein the second predetermined threshold value for determining the sense of the second pressure is higher than the first predetermined threshold value for determining the sense of the first pressure;
   wherein the at least one icon is different from the fingerprint image, and
   wherein the at least one icon and the fingerprint image are output on the black screen of the display so as not to overlap each other.

2. The fingerprint sensing method of claim 1, further comprising, when any one of one or more icons is touched in a state where the at least one icon has been displayed after the first pressure is sensed, performing an action assigned to the touched icon.

3. The fingerprint sensing method of claim 1, further comprising a fingerprint registration step of scanning and registering the fingerprint when the second pressure is sensed.

4. The fingerprint sensing method of claim 1, wherein a fingerprint sensor is activated when the first pressure is sensed.

5. A touch input device comprising:
   a pressure sensor which senses pressure applied by an object;
   a fingerprint sensor which recognizes a fingerprint of the object; and
   a processor configured to:
      determine whether a first pressure has been sensed, the first pressure having a value equal to or greater than a first predetermined threshold value and being applied by the object in a black screen mode;
      display at least one icon on the black screen of the display when the first pressure is sensed,
      determine continuously after sensing the first pressure whether a second pressure which has a value equal to or greater than a second predetermined threshold value and is different from the first pressure is sensed or not;
      display a fingerprint image for recognizing a fingerprint of the object on the black screen of the display when the second pressure is sensed,
      determine whether or not the fingerprint recognized by the second pressure is identical to a fingerprint previously registered in the touch input device; and
      display a home screen on the display when the recognized fingerprint is identical to the previously registered fingerprint;
   wherein the second predetermined threshold value which is for determining sense of the second pressure is higher than the first predetermined threshold value which is for determining sense of the first pressure;
   wherein the at least one icon is different from the fingerprint image, and
   wherein the at least one icon and the fingerprint image are output on the black screen of the display so as not to overlap each other.

6. The device of claim 5, wherein an action assigned to the touched icon is performed when any one of one or more icons is touched in a state where the at least one icon has been displayed after the first pressure is sensed.

7. The device of claim 5, wherein the fingerprint is scanned and registered when the second pressure is sensed.

8. The device of claim 5, wherein the fingerprint sensor is activated when the first pressure is sensed.

9. The fingerprint sensing method of claim 1, wherein the fingerprint image is displayed on a position where the second pressure has been applied.

10. The fingerprint sensing method of claim 1, wherein the fingerprint image is displayed on a position spaced apart by a predetermined distance from a position where the second pressure has been applied.

11. The device of claim 5, wherein the fingerprint image is displayed on a position where the second pressure has been applied.

12. The device of claim 5, wherein the fingerprint image is displayed on a position spaced apart by a predetermined distance from a position where the second pressure has been applied.

* * * * *